Oct. 25, 1938.  B. H. GIBBS  2,134,039
BRIDGE SCORE AND CONTRACT INDICATOR
Filed June 10, 1937  2 Sheets-Sheet 1
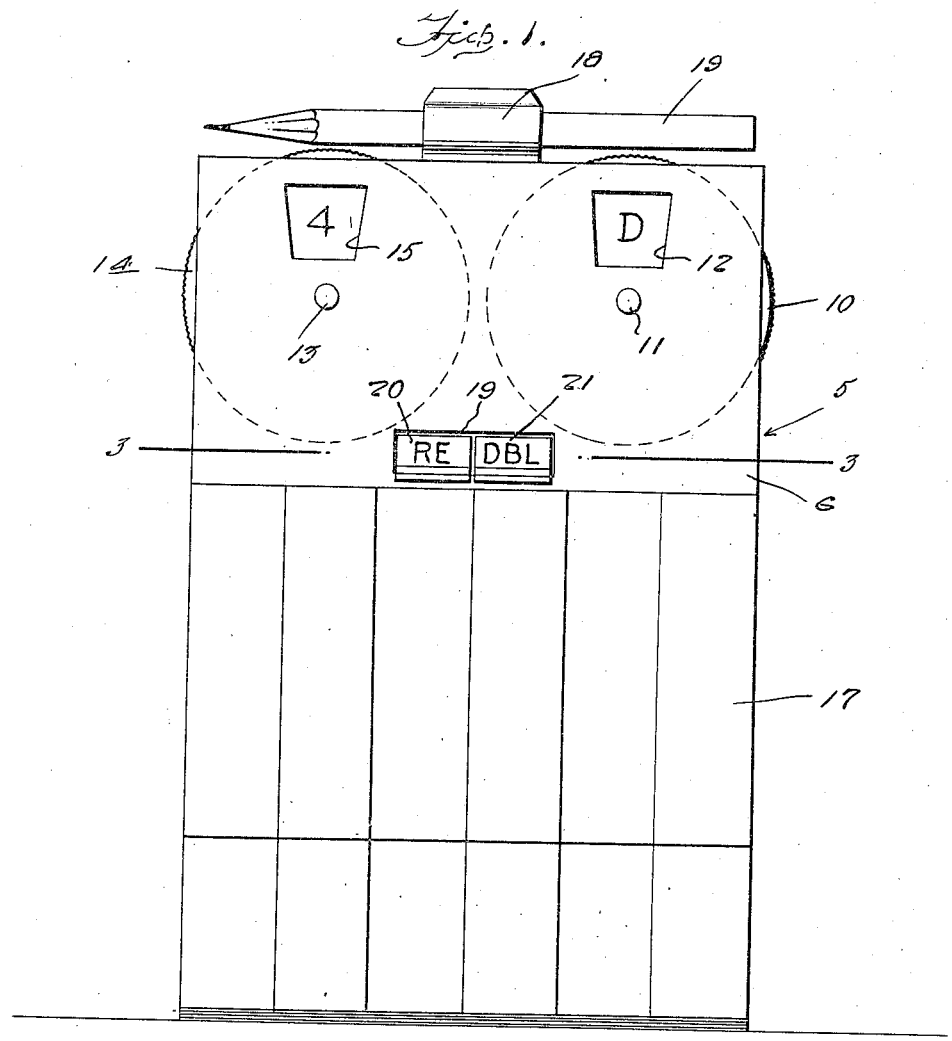
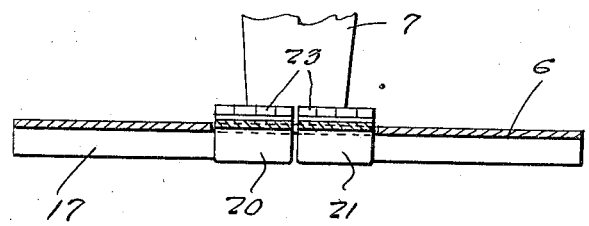
Inventor
*B. H. Gibbs*
By *Clarence A. O'Brien*
*Hyman Berman*
Attorneys Oct. 25, 1938.　　　　B. H. GIBBS　　　2,134,039
BRIDGE SCORE AND CONTRACT INDICATOR
Filed June 10, 1937　　　2 Sheets-Sheet 2

Inventor
B. H. Gibbs

By Clarence A. O'Brien
Hyman Berman
Attorneys

Patented Oct. 25, 1938

2,134,039

UNITED STATES PATENT OFFICE 2,134,039

BRIDGE SCORE AND CONTRACT INDICATOR

Benjamin Hugh Gibbs, Phoenix, Ariz.

Application June 10, 1937, Serial No. 147,553

2 Claims. (Cl. 40—67)

This invention, denominated a bridge score and contract indicator, is particularly adapted to facilitate the various steps and progress in bidding and playing the card games of auction and contract bridge.

An object of the invention is to provide a device of this character provided with means for indicating the bid, and for showing whether or not the "contract" has been doubled or redoubled; and the invention, together with its objects and advantages will be best understood from a study of the following description, taken in connection with the accompanying drawings, wherein:

Figure 1 is a front elevational view of the device.

Figure 3 is a sectional view taken substantially on the line 3—3 of Figure 1.

Figure 2:
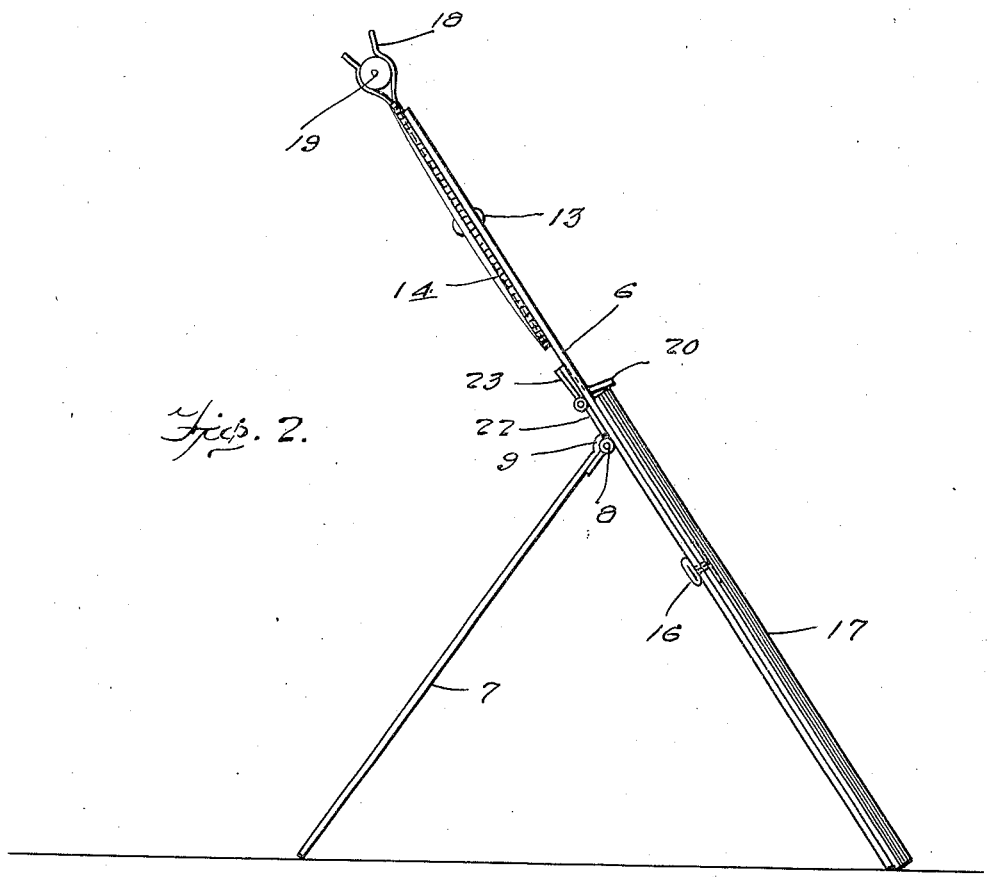
Figure 2 is a side elevational view of the device.

Referring to the drawings by reference numerals it will be seen that the device comprises an easel indicated generally by the reference numeral 5 and embodies a base plate 6 which in the present instance is substantially rectangular in form, and a supporting leg 7 hinged to the back of the plate 6 as at 8 and provided at its hinged end with an abutment 9 that limits the outward movement of the supporting leg 7 relative to the plate 6.

Figure 4:
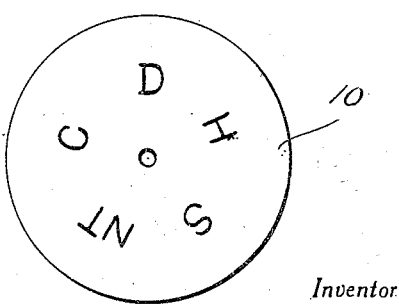
Figure 4 is a face view of a "trump" disc.

Rotatably supported on the plate 6 and disposed at the rear side of the plate, adjacent the upper right hand corner of the plate, is a "trump" disc 10 rotatable about a rivet 11 as an axis. On one face thereof, and as shown in Figure 4, the "trump" disc 10 has arranged in a circular series thereon, the letters "D", "H", "S", "NT", and "C", indicating respectively, the various trumps such as diamonds, hearts, spades, no trump, and clubs. Above the pivot 11, the plate 6 is provided with a sight window 12 and obviously by rotating the disk 10 the proper trump indicia is brought into view opposite the window 12.

Figure 5:
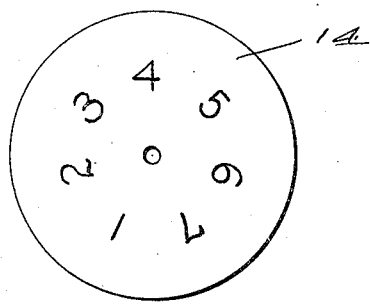
Figure 5 is a similar view of what may be termed a "bid" disc.

Also pivoted at the back of the plate 6 and adjacent the upper left hand corner of the plate through the medium of a rivet 13, is the "bid" disc 14 which on one face thereof, and as shown in Figure 5, is equipped with a circular series of numerals from 1 to 7 inclusive, to show the number of tricks bid. Above the pivot 13 the plate 6 is provided with a sight window 15 through which a selected numeral on which the disc 14 may be viewed when said numeral, by rotation of the disc, is brought into position opposite the window 15.

Disposed on the front side of the plate 6 and secured thereto through the medium of paper clips of the prong type or any other suitable fastening elements 16 is a book 17 of conventional score sheets on which will be noted the score as made.

At the upper edge thereof plate 6 is provided with a suitable clip 18 for conveniently holding a pencil 19.

A feature of the present invention is in providing the plate 6 above the pad 17 with a slot 19 elongated transversely of the plate 6. Secured to the plate 6 at the back side thereof, and in operative position to the slot 19 are L-shaped indicia bearing plates 20, 21. For each plate 20, 21, there is provided a hinge, one leaf 22 of which is suitably secured to the rear side of the plate 6, and the other leaf 23 of which is suitably secured to the rear side of one flange of a plate 20, or 21, as the case may be.

The plate 20 on one flange thereof is provided with the letters "RE", while the other plate, in the present instance, the plate 21, on one flange thereof is equipped with the letters "DBL". It will thus be seen that when a bid has been doubled, the plate 21 will be swung to the position shown in Figure 1 so that the flange thereof carrying the letters "DBL" will be brought into view through the slot 9 thus conveying the information to all concerned that the particular bid has been "doubled". Should the bid be redoubled, plate 20 is swung to the position shown in Figure 1 so that the flange thereon bearing the letters "RE" is brought into alignment with the letter equipped flange of the plate 21 so that by reading the indicia on the plates 20, 21, all concerned will note that the bid has been redoubled.

From the above, it will be appreciated that with a device of this character, all the possible bids from 1 to 7 inclusive, and all the possible trumps, from clubs to no trumps, may be clearly and conspicuously seen by all the players. In addition, by glancing at the device the players may readily note whether or not the "contract" has been doubled or redoubled as the case may be.

Also, by providing the score-sheet pad 17 there will be clearly and conspicuously available to each of the players at all times, information as to the exact stage to which the game or rubber has progressed. Each player at all times can readily see whether he and his partner are "vulnerable" or whether the opposing players are, and whether he and his partner, or his opponents have "part score" on game; all of which is very highly desirable, if not quite essentially necessary to enable the players properly to bid. As is well known, such information is of very considerable value, not only to the tyro and amateur, but also to the expert and master player.

It is thought that a clear understanding of the construction, utility, and advantages of an invention of this character will be had without a more detailed description.

It is also to be understood that the embodiment of the device herein illustrated is merely suggestive and that consequently it is in no wise intended to restrict the invention to the particular details herein illustrated and described, other than may be necessary in view of the prior art and scope of the appended claims; and in this connection it may be herein pointed out that, for example, instead of using letters on the disc 10 to indicate the various trumps the conventional trump indicia for the four suites, namely, hearts, diamonds, clubs and spades, may be used. Also, and as shown the discs 10 and 14 may be slightly concaved so that adjacent their respective peripheral edges they will have bearing contacts with the base plate 5 in a manner to frictionally retain the discs in the position of adjustment to which they may be moved, and against casual rotation. Also the peripheral edges of the discs 10 and 14 may be milled or otherwise roughened as shown to facilitate the turning thereof, and in this connection it will be further observed that the peripheries of the respective discs project laterally beyond the side edges of the base plate 5 so as to be readily engaged by the finger of the operator to further facilitate the turning of the discs.

Having thus described the invention, what is claimed as new is:

1. In a bridge score and contract indicator, a base plate provided with a slot elongated transversely thereof, L-shaped indicia bearing plates hingedly mounted on said base plate at the rear side of the latter and adjacent the lower edge of said slot whereby upon swinging movement of a plate a selected flange thereof is positioned to view across said slot.

2. In a bridge score and contract indicator, a base plate provided with a slot elongated transversely thereof, L-shaped indicia bearing plates hingedly mounted on said base plate at the rear side of the latter and adjacent the lower edge of said slot whereby upon swinging movement of a plate a selected flange thereof is positioned to view across said slot, one of said L-shaped plates having on one flange thereof the notation "DBL" to indicate "double", and the other of said L-shaped plates having on one flange thereof the notation "RE" adapted to be read in conjunction with the first mentioned notation to indicate "redouble".

BENJAMIN HUGH GIBBS.